United States Patent
Nakano et al.

(10) Patent No.: US 10,469,014 B2
(45) Date of Patent: Nov. 5, 2019

(54) CONTROL DEVICE FOR PERMANENT MAGNET-TYPE ROTATING ELECTRICAL MACHINE

(71) Applicant: Mitsubishi Electric Corporation, Tokyo (JP)

(72) Inventors: Kotaro Nakano, Tokyo (JP); Noriyuki Wada, Tokyo (JP); Daiki Matsuura, Tokyo (JP); Hideaki Kawamoto, Tokyo (JP); Hiroyuki Kobayashi, Hyogo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 0 days.

(21) Appl. No.: 15/767,736

(22) PCT Filed: Nov. 25, 2015

(86) PCT No.: PCT/JP2015/083030
§ 371 (c)(1),
(2) Date: Apr. 12, 2018

(87) PCT Pub. No.: WO2017/090109
PCT Pub. Date: Jun. 1, 2017

(65) Prior Publication Data
US 2018/0302013 A1    Oct. 18, 2018

(51) Int. Cl.
*H02P 21/00*    (2016.01)
*H02P 27/04*    (2016.01)
(Continued)

(52) U.S. Cl.
CPC .......... *H02P 21/0089* (2013.01); *H02K 1/27* (2013.01); *H02P 6/08* (2013.01); *H02P 6/16* (2013.01);
(Continued)

(58) Field of Classification Search
CPC ........ H02P 21/0089; H02P 27/04; H02P 6/08; H02P 21/06; H02P 21/22; H02P 6/16; H02K 29/12; H02K 1/27
See application file for complete search history.

(56) References Cited

U.S. PATENT DOCUMENTS

2015/0207446 A1* 7/2015 Kakihara ................ H02P 6/183
318/400.33

FOREIGN PATENT DOCUMENTS

JP    2002-095300 A       3/2002
JP    2002095300 A   *   3/2002
(Continued)

OTHER PUBLICATIONS

International Search Report for PCT/JP2015/083030, dated Feb. 16, 2016.

*Primary Examiner* — Kawing Chan
*Assistant Examiner* — Bradley R Brown
(74) *Attorney, Agent, or Firm* — Sughrue Mion, PLLC; Richard C. Turner

(57) ABSTRACT

Provided is a control device for a permanent magnet-type rotating electrical machine (100), which includes a current coordinate transformation unit (109) configured to output a d-axis current and a q-axis current by coordinate transformation of three-phase AC currents respectively detected by current detection units (111, 112, 113), a current correction direction calculation unit (108) configured to calculate a current correction direction through use of the d-axis current and the q-axis current, and a current correction amount addition unit (102) configured to correct a d-axis current command and a q-axis current command based on the current correction direction. In this manner, an induced voltage is converged to lie within a maximum voltage circle in accordance with a power supply voltage.

5 Claims, 5 Drawing Sheets

(51) Int. Cl.
*H02P 6/08* (2016.01)
*H02P 6/16* (2016.01)
*H02P 21/06* (2016.01)
*H02K 1/27* (2006.01)
*H02P 21/22* (2016.01)
*H02K 21/16* (2006.01)
*H02K 29/12* (2006.01)

(52) U.S. Cl.
CPC .............. *H02P 21/06* (2013.01); *H02P 21/22* (2016.02); *H02P 27/04* (2013.01); *H02K 21/16* (2013.01); *H02K 29/12* (2013.01); *H02K 2213/03* (2013.01)

(56) References Cited

FOREIGN PATENT DOCUMENTS

| | | | |
|---|---|---|---|
| JP | 2003-009598 A | | 1/2003 |
| JP | 2003009598 A | * | 1/2003 |

\* cited by examiner

VOLTAGE LIMITING ELLIPSE

MAXIMUM VOLTAGE CIRCLE

CONTROL DEVICE FOR PERMANENT MAGNET-TYPE ROTATING ELECTRICAL MACHINE

CROSS REFERENCE TO RELATED APPLICATIONS

This application is a National Stage of International Application No. PCT/JP2015/083030 filed Nov. 25, 2015.

TECHNICAL FIELD

The present invention relates to a control device for a permanent magnet-type rotating electrical machine, and more particularly, to a control device for a permanent magnet-type rotating electrical machine, which is configured to converge an induced voltage to a value in accordance with a power supply voltage.

BACKGROUND ART

Permanent magnet-type synchronous motors are used for general purposes (see, for example, Patent Literature 1 and Patent Literature 2).

With a method of controlling a permanent magnet-type synchronous motor, which is described in Patent Literature 1, a temperature detector is embedded in a winding of the permanent magnet-type synchronous motor to indirectly detect a temperature Tmg of a magnet so as to obtain an interlinkage magnetic flux number φm of the winding by using an interlinkage magnet table with respect to the temperature. An Id calculation unit calculates, from the winding interlinkage magnetic flux number φm, a q-axis current command Iq*, and a rotation speed ω, and other values, a d-axis current command Id* that allows a voltage to be kept constant even when φm changes.

With a vector control method for an AC motor, which is described in Patent Literature 2, when an absolute value of a d-axis voltage command value Vd* becomes larger than a limit value Vdlim thereof, a voltage command value limitation unit limits the d-axis voltage command value Vd*. When a length Vl* of a synthetic vector of the d-axis voltage command value Vd* and a q-axis voltage command value Vq* still exceeds a limit value thereof, the voltage command limitation unit corrects the length Vl* of the synthetic vector to a preset limit value or smaller.

CITATION LIST

Patent Literature

[PTL 1] JP 2002-095300 A
[PTL 2] JP 2003-009598 A

SUMMARY OF INVENTION

Technical Problem

In Patent Literature 1, when a voltage amplitude induced in the motor exceeds a maximum voltage in accordance with a power supply voltage along with an increase in counter electromotive voltage in accordance with an operating state of the motor, field-weakening control for controlling a current phase so as to equivalently weaken a field amount of a rotor is executed by correcting a target d-axis current.

Further, in Patent Literature 2, when the voltage amplitude induced in the motor exceeds the maximum voltage in accordance with the power supply voltage, the d-axis voltage command is limited, and the q-axis voltage current is then limited.

In Patent Literature 1, however, when the voltage amplitude is present in a first quadrant and a second quadrant, specifically, when a voltage advance is smaller than 180 degrees, the voltage amplitude can be converged by the field-weakening control to lie within a maximum voltage circle. When the voltage amplitude is present in a third quadrant, specifically, when the voltage advance is equal to or larger than 180 degrees, however, there arises a problem in that the voltage amplitude cannot be converged by the field-weakening control to lie within the maximum voltage circle.

Further, in Patent Literature 2, only the d-axis voltage command is limited. Therefore, the voltage command is not decreased in a direction toward a center of the maximum voltage circle, specifically, 0, and a current command is not corrected in a direction toward a center of a voltage limiting ellipse. Thus, there arises a problem in that the voltage amplitude cannot be quickly converged to lie within the maximum voltage circle.

The present invention has been made to solve the problems described above, and has an object to provide a control device for a permanent magnet-type rotating electrical machine capable of correcting a d-axis current and a q-axis current even for a slight current change so that an induced voltage can be converged by field-weakening control to lie within a maximum voltage circle in accordance with a power supply voltage.

Solution to Problem

According to one embodiment of the present invention, there is provided a control device for a permanent magnet-type rotating electrical machine, the permanent magnet-type rotating electrical machine including: a rotor including a permanent magnet; and a stator including coils configured to generate a rotating magnetic field for rotating the rotor, the control device including: an inverter configured to receive AC voltage commands as input and apply AC voltages to the permanent magnet-type rotating electrical machine based on the AC voltage commands; a magnetic-pole position detection unit configured to detect a magnetic-pole position of the rotor; current detection units configured to respectively detect AC currents flowing between the inverter and the permanent magnet-type rotating electrical machine; a current coordinate transformation unit configured to transform the AC currents respectively detected by the current detection units into a d-axis current and a q-axis current with a magnetic field direction at the magnetic-pole position being defined as a d-axis and a direction orthogonal to the d-axis being defined as a q-axis; a current correction amount addition unit configured to receive a d-axis current command and a q-axis current command as input from outside, and correct the d-axis current command and the q-axis current command to output a corrected d-axis current command and a corrected q-axis current command; a current control unit configured to calculate a d-axis voltage non-interference term and a q-axis voltage non-interference term, a d-axis voltage proportional term and a q-axis voltage proportional term, and a d-axis voltage integral term and a q-axis voltage integral term based on the d-axis current and the q-axis current, and on the corrected d-axis current command and the corrected q-axis current command so that the d-axis current follows the corrected d-axis current command and the q-axis current follows the corrected q-axis current command; a voltage command generation unit configured to generate a d-axis voltage command and a q-axis voltage command based on the d-axis voltage non-interference term and the q-axis voltage non-interference term, the d-axis voltage proportional term and the q-axis voltage proportional term, and the d-axis voltage integral term and the q-axis voltage integral term; a voltage coordinate transformation unit configured to transform the d-axis voltage command and the q-axis voltage command into the AC voltage commands to be input to the inverter; a voltage deviation calculation unit configured to calculate a voltage deviation being a deviation between the d-axis voltage command and the q-axis voltage command, which are output from the voltage command generation unit, and a maximum voltage in accordance with a power supply voltage; a current correction amount calculation unit configured to calculate a current correction amount in accordance with the voltage deviation; an inductance storage unit configured to prestore a d-axis inductance and a q-axis inductance as fixed values or map values that use the d-axis current and the q-axis current as arguments; a current correction direction calculation unit configured to calculate a current correction direction based on at least any one of a set of the d-axis current and the q-axis current and a set of the d-axis current command and the q-axis current command, and on the d-axis inductance and the q-axis inductance; and a current correction amount decomposition unit configured to calculate a d-axis current correction amount and a q-axis current correction amount to be used for the correction in the current correction amount addition unit based on the current correction amount and the current correction direction, in which the current correction amount addition unit is configured to add the d-axis current correction amount to the d-axis current command to calculate the corrected d-axis current command, and to add the q-axis current correction amount to the q-axis current command to calculate the corrected q-axis current command.

Advantageous Effects of Invention

In the present invention, the current correction direction is obtained based on the d-axis current and the q-axis current obtained by coordinate transformation of three-phase AC currents detected respectively by the current detection units to obtain the correction amount by using the current correction direction, thereby correcting the d-axis current command and the q-axis current command, which are input from the outside. Thus, the induced voltage can be quickly converged by the field-weakening control to lie within the maximum voltage circle in accordance with the power supply voltage.

DESCRIPTION OF EMBODIMENTS

First Embodiment

Figure 1:
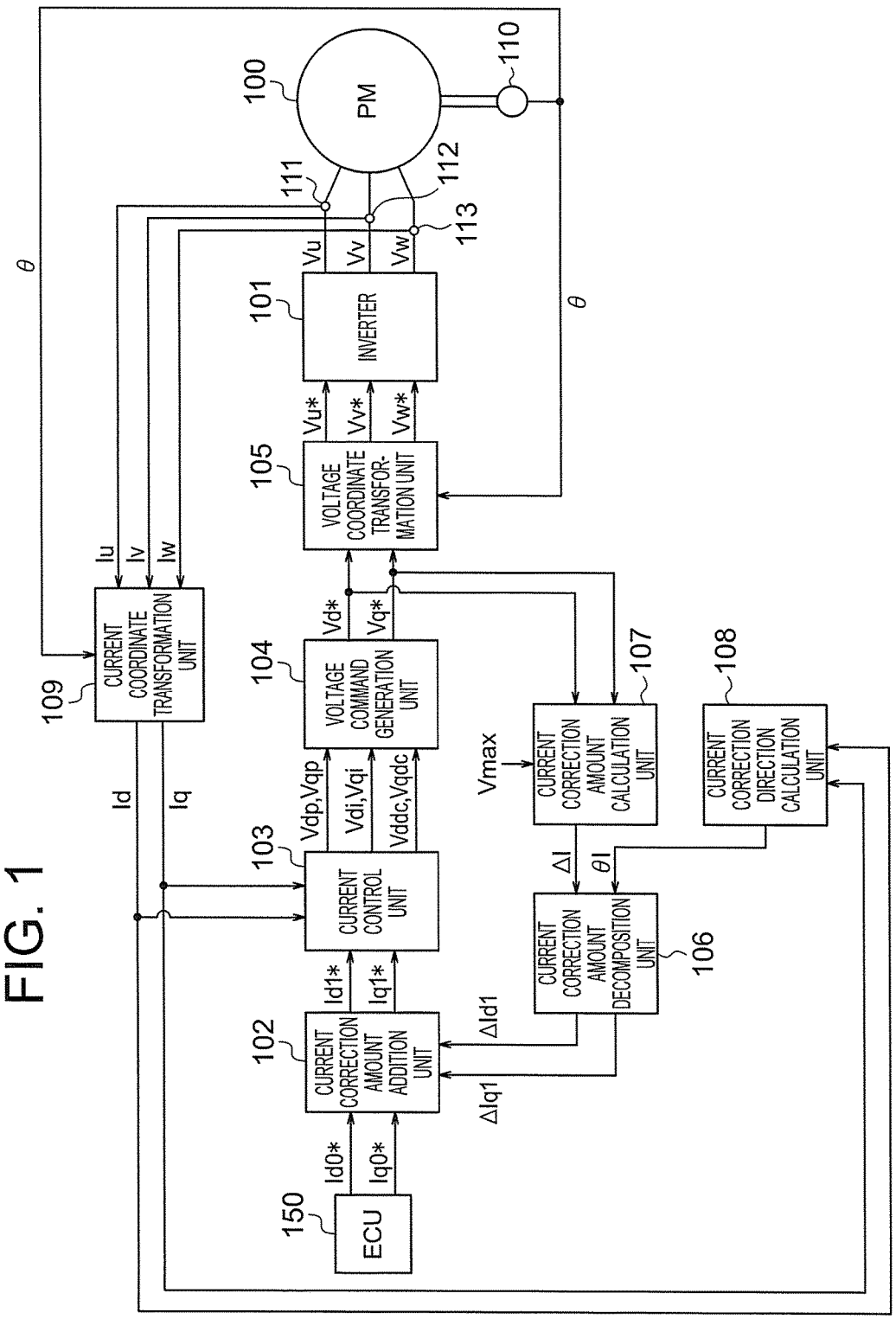
FIG. 1 is a block diagram for illustrating a configuration of a control device for a permanent magnet-type rotating electrical machine according to a first embodiment of the present invention.
Figure 5:
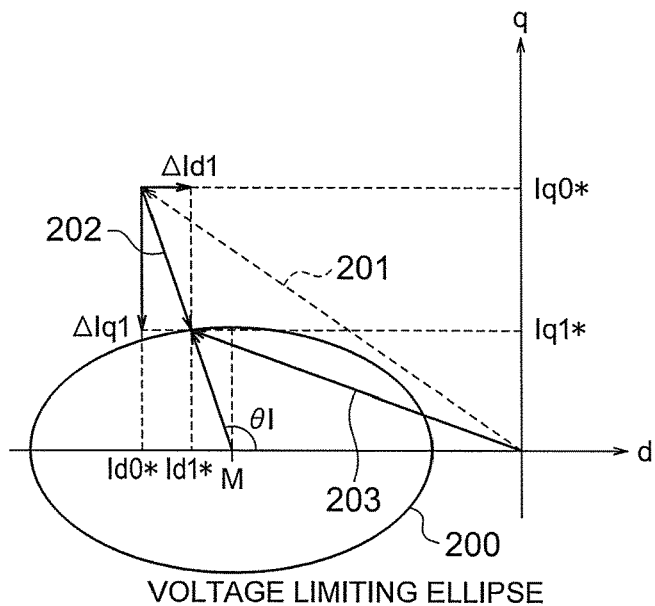
FIG. 5 is a current vector diagram of the control device for a permanent magnet-type rotating electrical machine according to each of the first to fourth embodiments of the present invention.
Figure 6:
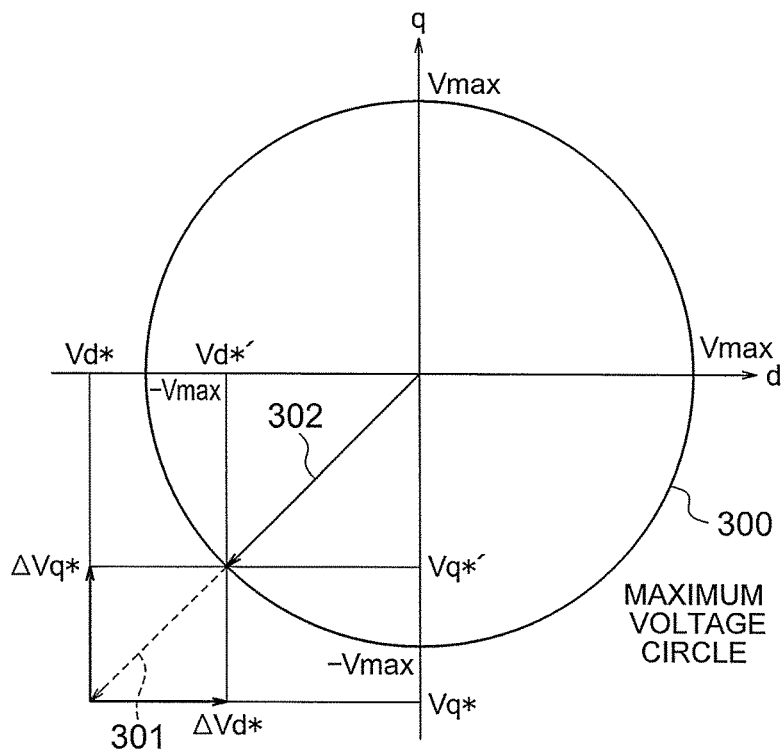
FIG. 6 is a voltage vector diagram of the control device for a permanent magnet-type rotating electrical machine according to each of the first to fourth embodiments of the present invention.

Now, a control device for a permanent magnet-type rotating electrical machine (hereinafter referred to simply as "control device") according to a first embodiment of the present invention is described. FIG. 1 is a block diagram for illustrating a configuration of the control device according to the first embodiment. FIG. 5 is a current vector diagram of the control device according to the first embodiment. FIG. 6 is a voltage vector diagram of the control device according to the first embodiment.

As illustrated in FIG. 1, the control device according to the first embodiment of the present invention is disposed for a permanent magnet-type rotating electrical machine 100 being a target to be controlled.

The permanent magnet-type rotating electrical machine 100 includes a rotor including a permanent magnet and a stator including coils. The coils of the stator generate a rotating magnetic field for rotating the rotor. The permanent magnet-type electrical machine 100 in this case is a three-phase AC rotating electrical machine with a U-phase, a V-phase, and a W-phase.

A magnetic-pole position detection unit 110 is connected to the permanent magnet-type rotating electrical machine 100. The magnetic-pole position detection unit 110 detects a magnetic-pole position θ of the rotor of the permanent magnet-type rotating electrical machine 100.

As illustrated in FIG. 1, the control device according to the first embodiment includes an inverter 101, a current correction amount addition unit 102, a current control unit 103, a voltage command generation unit 104, a voltage coordinate transformation unit 105, a current correction amount decomposition unit 106, a current correction amount calculation unit 107, a current correction direction calculation unit 108, and a current coordinate transformation unit 109. Further, an electronic control unit (ECU) 150 is connected to the control device. The electronic control unit (ECU) 150 is a higher-level device for the control device, and is disposed outside of the control device.

The inverter 101 is connected to the permanent magnet-type rotating electrical machine 100 through three-phase lines. Further, the inverter 101 is connected to a power supply (not shown) through a rectifier circuit and a smoothing circuit. The power supply is a high-voltage DC power supply for a vehicle, which transmits and receives electric energy. An AC voltage from the power supply is rectified in the rectifier circuit (not shown), and is then smoothed in the smoothing circuit (not shown) into a DC voltage to be supplied to the inverter 101.

Three-phase AC voltage commands Vu*, Vv*, and Vw* described later are input to the inverter 101 from the voltage coordinate transformation unit 105. The inverter 101 uses electric power supplied from the power supply to apply AC voltages Vu, Vv, and Vw to the permanent magnet-type rotating electrical machine 100 through the three-phase lines based on the three-phase AC voltage commands Vu*, Vv*, and Vw*. In this manner, the coils of the stator of the permanent magnet-type rotating electrical machine 100 are energized to generate an induced voltage in the coils. The rotor is rotated by the induced voltage. The control device according to the first embodiment performs control for quickly converging the induced voltage so that the induced voltage lies within a maximum voltage circle in accordance with a power supply voltage.

Current detection units 111, 112, and 113 are arranged between the inverter 101 and the permanent magnet-type rotating electrical machine 100. The current detection units 111, 112, and 113 detect three-phase AC currents Iu, Iv, and Iw flowing between the inverter 101 and the permanent magnet-type rotating electrical machine 100, respectively.

The electronic control device (ECU) 150 is connected to the current correction amount addition unit 102. A d-axis current command Id0* and a q-axis current command Iq0* are input to the current correction amount addition unit 102 from the electronic control unit (ECU) 150. It is assumed that a magnetic field direction at a magnetic-pole position of the rotor of the permanent magnet-type rotating electrical machine 100 is a d-axis, and that a direction orthogonal to the d-axis is a q-axis. Further, a d-axis current correction amount ΔId1 and a q-axis current correction amount ΔIq1 are also input to the current correction amount addition unit 102 from the current correction amount decomposition unit 106 described later. The current correction amount addition unit 102 adds the d-axis current correction amount ΔId1 to the d-axis current command Id0* to output a corrected d-axis current command Id1*, and adds the q-axis current correction amount ΔIq1 to the q-axis current command Iq0* to output a corrected q-axis current command Iq1* in accordance with Expression (1).

$$Id1^* = Id0^* + \Delta Id1$$

$$Iq1^* = Iq0^* + \Delta Iq1 \quad (1)$$

The corrected d-axis current command Id1* and the corrected q-axis current command Iq1* are input to the current control unit 103 from the current correction amount addition unit 102. Further, a d-axis current Id and a q-axis current Iq are also input to the current control unit 103 from the current coordinate transformation unit 109. The current control unit 103 performs feedback control so that the d-axis current Id follows the corrected d-axis current command Id1* and that the q-axis current Iq follows the corrected q-axis current command Iq1*. More specifically, the current control unit 103 calculates a d-axis voltage non-interference term Vddc and a q-axis voltage non-interference term Vqdc, a d-axis voltage proportional term Vdp and a q-axis voltage proportional term Vqp, and a d-axis voltage integral term Vdi and a q-axis voltage integral term Vqi based on the corrected d-axis current command Id1* and the corrected q-axis current command Iq1*, and the d-axis current Id and the q-axis current Iq by the feedback control through use of Expressions (2) to (4).

$$Vdi = Kdi \int (id1^* - Id) dt$$

$$Vqi = Kqi \int (Iq1^* - Iq) dt \quad (2)$$

In Expression (2), Kdi is a d-axis integral term gain and Kqi is a q-axis integral term gain, which are defined as suitable matched arbitrary numerical values.

$$Vdp = Kdp(Id1^* - Id) \quad (3)$$

$$Vqp = Kqp(Iq1^* - Iq)$$

In Expression (3), Kdp is a d-axis proportional term gain and Kqp is a q-axis proportional term gain, which are defined as suitable matched arbitrary numerical values.

$$Vddc = -\omega e \times Lq \times Iq \quad (4)$$

$$Vqdc = \omega e \times (Ld \times Id + \varphi m)$$

In Expression (4), Ld is a d-axis inductance and Lq is a q-axis inductance. The d-axis inductance and the q-axis inductance are prestored in a memory (not shown) included in the control device. The d-axis inductance and the q-axis inductance may be fixed values that are constant independently of operating conditions, or may be map values that change in accordance with operating conditions. An example in which the d-axis inductance and the q-axis inductance are map values is described. The control device prestores in the memory a map that predefines correspondence relationships between, for example, the d-axis current Id and the d-axis inductance and between the q-axis current Iq and the q-axis inductance. The current control unit 103 obtains corresponding values of the d-axis inductance and the q-axis inductance from the map through use of the d-axis current Id and the q-axis current Iq as arguments. The arguments may be other parameters.

Further, in Expression (4), Φm is a magnetic flux of the permanent magnet of the rotor included in the permanent magnet-type rotating electrical machine 100. Although the magnetic flux Φm is a measured fixed value, the magnetic flux Φm may be a MAP value using a voltage or other values as an argument, or may be an estimate value estimated from the voltage or other values.

Further, in Expression (4), ωe is a rotation speed of the rotor included in the permanent magnet-type rotating electrical machine 100. The rotation speed ωe is obtained by differentiating the magnetic-pole position θ detected by the magnetic-pole position detection unit 110.

The voltage command generation unit 104 adds the d-axis voltage non-interference term Vddc, the d-axis voltage proportional term Vdp, and the d-axis voltage integral term Vdi, and adds the q-axis voltage non-interference term Vqdc, the q-axis voltage proportional term Vqp, and the q-axis voltage integral term Vqi, which are output from the current control unit 103, to obtain a d-axis voltage command Vd* and a q-axis voltage command Vq* in accordance with Expression (5).

$$Vd^* = Vdp + Vdi + Vddc \quad (5)$$

$$Vq^* = Vqp + Vqi + Vqdc$$

The d-axis voltage command Vd* and the q-axis voltage command Vq* are input to the voltage coordinate transformation unit 105 from the voltage command generation unit 104. Further, the magnetic-pole position θ detected by the magnetic-pole position detection unit 110 is also input to the voltage coordinate transformation unit 105. The voltage coordinate transformation unit 105 generates the three-phase AC voltage commands Vu*, Vv*, and Vw* from the d-axis voltage command Vd*, the q-axis voltage command Vq*, and the magnetic-pole position θ through use of Expression (6). The generated three-phase AC voltage commands Vu*, Vv*, and Vw* are input to the inverter 101.

$$\begin{pmatrix} Vu* \\ Vv* \\ Vw* \end{pmatrix} = \sqrt{\frac{2}{3}} \begin{pmatrix} 1 & 0 \\ -\frac{1}{2} & \frac{\sqrt{3}}{2} \\ -\frac{1}{2} & -\frac{\sqrt{3}}{2} \end{pmatrix} \begin{pmatrix} \cos\theta & -\sin\theta \\ \sin\theta & \cos\theta \end{pmatrix} \begin{pmatrix} Vd* \\ Vq* \end{pmatrix} \quad (6)$$

The three-phase AC currents Iu, Iv, and Iw respectively detected by the current detection units 111, 112, and 113 are input to the current coordinate transformation unit 109. Further, the magnetic-pole position θ detected by the magnetic-pole position detection unit 110 is also input to the current coordinate transformation unit 109. The d-axis current Id and the q-axis current Iq are calculated from the three-phase AC currents Iu, Iv, and Iw and the magnetic-pole position θ through use of Expression (7).

$$\begin{pmatrix} Id \\ Iq \end{pmatrix} = \begin{pmatrix} \cos\theta & \sin\theta \\ -\sin\theta & \cos\theta \end{pmatrix} \sqrt{\frac{2}{3}} \begin{pmatrix} 1 & -\frac{1}{2} & -\frac{1}{2} \\ 0 & \frac{\sqrt{3}}{2} & -\frac{\sqrt{3}}{2} \end{pmatrix} \begin{pmatrix} Iu \\ Iv \\ Iw \end{pmatrix} \quad (7)$$

The d-axis voltage command Vd* and the q-axis voltage command Vq* are input to the current correction amount calculation unit 107 from the voltage command generation unit 104. Further, a maximum voltage Vmax in accordance with a power supply voltage Vpn is also input to the current correction amount calculation unit 107. The maximum voltage Vmax is calculated through use of Expression (20).

$$V\text{max} = Vpn \times MR\text{max} \quad (20)$$

The value MRmax used in Expression (20) is a numerical value determined by an experiment or other methods. For example, MRmax is determined so that a current oscillation and a system loss (in the inverter, the motor, or other components) become minimum. The current correction amount calculation unit 107 calculates a voltage deviation, which is a deviation between the d-axis voltage command Vd* and the q-axis voltage command Vq* and the maximum voltage Vmax. The voltage deviation is defined as a difference between a square root of sum of squares of the d-axis voltage command Vd* and the q-axis voltage command Vq* and the maximum voltage Vmax. The current correction amount calculation unit 107 calculates a current correction amount ΔI based on the voltage deviation through use of Expression (8).

$$\Delta I = k\Delta I \times \int (V\text{max} - \sqrt{Vd*^2 + Vq*^2}) dt \quad (8)$$

In Expression (8), KΔI is a gain, and a numerical value adjusted by matching or other methods is used. Although integral control is assumed in Expression (8), proportional control and derivative control may also be included.

The d-axis current Id and the q-axis current Iq are input to the current correction direction calculation unit 108 from the current coordinate transformation unit 109. Further, the current correction direction calculation unit 108 acquires the d-axis inductance Ld and the q-axis inductance Lq from the memory described above. The current correction direction calculation unit 108 calculates a current correction direction θI based on the d-axis current Id and the q-axis current Iq, and the d-axis inductance Ld and the q-axis inductance Lq in accordance with Expression (9).

$$\theta I = \tan^{-1}\left(\frac{Ld}{Lq} \times \frac{Lq \times Iq}{Ld \times Id + \Phi m}\right) \quad (9)$$

The current correction amount ΔI is input to the current correction amount decomposition unit 106 from the current correction amount calculation unit 107. Further, the current correction direction θI is also input to the current correction amount decomposition unit 106 from the current correction direction calculation unit 108. The current correction amount decomposition unit 106 calculates the d-axis current correction amount ΔId1 and the q-axis current correction amount ΔIq1 from the current correction amount ΔI and the current correction direction θI.

$$\Delta Id1 = \Delta I \times \cos(\theta I)$$

$$\Delta Iq1 = I \times \cos(\theta I) \quad (10)$$

In the first embodiment, the current correction direction θI is calculated based on the d-axis current Id and the q-axis current Iq obtained by the coordinate transformation of the three-phase AC currents Iu, Iv, and Iw respectively measured by the current detection units 111, 112, and 113 in the current coordinate transformation unit 109 so that the d-axis current command Id0* and the q-axis current command Iq0* are corrected by using the current correction direction θI. Therefore, the following effects are expected.

In the first embodiment, the d-axis current command Id0* and the q-axis current command Iq0* can be corrected for a minimum current change. Thus, the induced voltage can be quickly converged by the field-weakening control without deviating from the maximum voltage circle in accordance with the power supply voltage.

The above-mentioned fact is described referring to FIG. 5 and FIG. 6.

FIG. 5 is a current vector diagram in the first embodiment. FIG. 6 is a voltage vector diagram in the first embodiment.

First, the current is described referring to FIG. 5.

As described above, the electronic control unit (ECU) 150 outputs the current commands Id0* and Iq0*. At this time, as shown in FIG. 5, a length of a synthetic vector 201 of the current command Id0* and the current command Iq0* is not converged to lie within a voltage limiting ellipse 200.

In order to converge the synthetic vector 201 so that the synthetic vector 201 lies within the voltage limiting ellipse 200, the synthetic vector 201 is required to be transformed into a synthetic vector 203. In order to obtain the synthetic vector 203 from the synthetic vector 201, it is only required to add a synthetic vector 202 to the synthetic vector 201. Therefore, a direction of the synthetic vector 202 is obtained. The direction is a direction from a tip of the synthetic vector 201 toward a center M of the voltage limiting ellipse 200. This direction is the current correction direction θI described above.

Therefore, the current correction direction θI is obtained based on the d-axis current Id and the q-axis current Iq, and the d-axis inductance Ld and the q-axis inductance Lq so that the current correction direction of the synthetic vector 201 is the direction toward the center M of the voltage limiting ellipse 200. Next, the d-axis current correction amount ΔId1 and the q-axis current correction amount ΔIq1 are obtained based on the current correction direction θI. A synthetic vector of the thus obtained d-axis current correction amount ΔId1 and q-axis current correction amount ΔIq1 is the synthetic vector 202, as shown in FIG. 5. Therefore, through addition of the synthetic vector 202 to the synthetic vector 201, the synthetic vector 203 is obtained.

Next, the voltage is described referring to FIG. 6.

A synthetic vector of the voltage, which corresponds to the resultant voltage 201 of the current shown in FIG. 5, is a synthetic vector 301 shown in FIG. 6. A length of the resultant voltage 301 is not converged so as to lie within a maximum voltage circle 300 in accordance with the power supply voltage.

Meanwhile, a synthetic vector of the voltage, which corresponds to the resultant voltage 203 of the current shown in FIG. 5, is a synthetic vector 302 shown in FIG. 6. A length of the resultant voltage 302 is converged so as to lie within the maximum voltage circle 300 in accordance with the power supply voltage.

As described above, in the first embodiment, the current correction direction θI is calculated based on the d-axis current Id and the q-axis current Iq, which are obtained by the coordinate transformation of the three-phase AC currents Iu, Iv, and Iw respectively measured by the current detection units 111, 112, and 113, so that the d-axis current command Id0* and the q-axis current command Iq0* are corrected by using the current correction direction θI. Thus, even for a slight current change, the d-axis current command Id0* and the q-axis current command Iq0* can be corrected. Therefore, the induced voltage can be quickly converged by the field-weakening control to lie within the maximum voltage circle 300 in accordance with the power supply voltage.

As described above, the control device for a permanent magnet-type rotating electrical machine according to the first embodiment includes the inverter 101 configured to receive the AC voltage commands Vu*, Vv*, Vw* as input and apply the AC voltages Vu, Vv, and Vw to the permanent magnet-type rotating electrical machine 100 based on the AC voltage commands, the magnetic-pole position detection unit 110 configured to detect the magnetic-pole position θ of the rotor, the current detection units 111, 112, and 113 configured to respectively detect the AC currents flowing between the inverter 101 and the permanent magnet-type rotating electrical machine 100, the current coordinate transformation unit 109 configured to transform the AC currents Iu, Iv, and Iw respectively detected by the current detection units into the d-axis current Id and the q-axis current Iq with the magnetic-field direction of the magnetic-pole position θ being defined as the d-axis and the direction orthogonal to the d-axis being defined as the q-axis, the current correction amount addition unit 102 configured to receive the d-axis current command Id0* and the q-axis current command Iq0* as input from outside, and correct the d-axis current command and the q-axis current command to output the corrected d-axis current command Id1* and the corrected q-axis current command Iq1*, the current control unit 103 configured to calculate the d-axis voltage non-interference term Vddc and the q-axis voltage non-interference term Vqdc, the d-axis voltage proportional term Vdp and the q-axis voltage proportional term Vqp, and the d-axis voltage integral term Vdi and the q-axis voltage integral term Vqi based on the d-axis current Id and the q-axis current Iq and the corrected d-axis current command Id1*, and on the corrected q-axis current command Iq1* so that the d-axis current Id follows the corrected d-axis current command Id1* and the q-axis current Iq follows the corrected q-axis current command Iq1*, the voltage command generation unit 104 configured to generate the d-axis voltage command Vd* and the q-axis voltage command Vq* based on the d-axis voltage non-interference term Vddc and the q-axis voltage non-interference term Vqdc, the d-axis voltage proportional term Vdp and the q-axis voltage proportional term Vqp, and the d-axis voltage integral term Vdi and the q-axis voltage integral term Vqi, the voltage coordinate transformation unit 105 configured to transform the d-axis voltage command Vd* and the q-axis voltage command Vq* into the AC voltage commands Vu*, Vv*, and Vw* to be input to the inverter 101, the current correction amount calculation unit 107 including a voltage deviation calculation unit configured to calculate the voltage deviation being a deviation between the d-axis voltage command Vd* and the q-axis voltage command Vq*, which are output from the voltage command generation unit 104, and the maximum voltage Vmax in accordance with the power supply voltage and a current correction amount calculation unit configured to calculate the current correction amount DI in accordance with the voltage deviation, the memory serving as an inductance storage unit configured to prestore the d-axis inductance Ld and the q-axis inductance Lq as the fixed values or the map values that use the d-axis current Id and the q-axis current Iq as the arguments, the current correction direction calculation unit 108 configured to calculate the current correction direction θI based on the d-axis current Id and the q-axis current Iq output from the current coordinate transformation unit 109, and on the d-axis inductance Ld and the q-axis inductance Lq, and the current correction amount decomposition unit 106 configured to calculate the d-axis current correction amount ΔId1 and the q-axis current correction amount ΔIq1 to be used for the correction in the current correction amount addition unit 102 based on the current correction amount ΔI and the current correction direction θI. The current correction amount addition unit 102 is configured to add the d-axis current correction amount ΔId1 to the d-axis current command Id0* to calculate the corrected d-axis current command Id1*, and to add the q-axis current correction amount ΔIq1 to the q-axis current command Iq0* to calculate the corrected q-axis current command Iq1*. In this manner, in the first embodiment, the current correction direction θI is calculated based on the d-axis current Id and the q-axis current Iq obtained by the coordinate transformation of the three-phase AC currents Iu, Iv, and Iw respectively measured by the current detection units 111, 112, and 113 so that the d-axis current command Id0* and the q-axis current command Iq0* are corrected by using the current correction direction θI. Therefore, even for a slight current change, the d-axis current command Id0* and the q-axis current command Iq0* can be corrected. Therefore, the induced voltage can be quickly converged by the field-weakening control to lie within the maximum voltage circle 300 in accordance with the power supply voltage.

Second Embodiment

Figure 2:
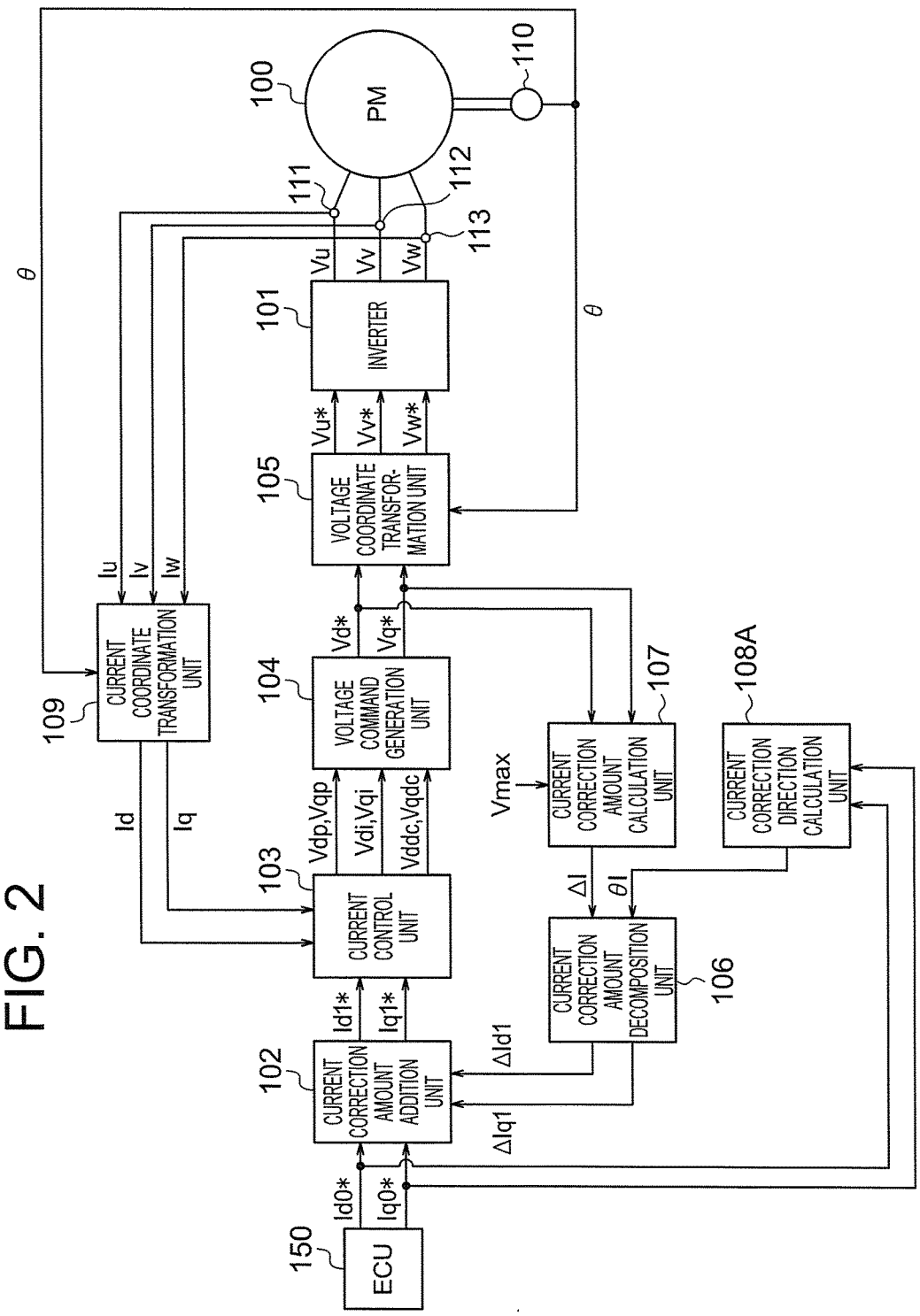
FIG. 2 is a block diagram for illustrating a configuration of a control device for a permanent magnet-type rotating electrical machine according to a second embodiment of the present invention.

Now, a control device for a permanent magnet-type rotating electrical machine (hereinafter referred to simply as "control device") according to a second embodiment of the present invention is described. FIG. 2 is a block diagram for illustrating a configuration of the control device according to the second embodiment. FIG. 5 is a current vector diagram of the control device according to the second embodiment. FIG. 6 is a voltage vector diagram of the control device according to the second embodiment. FIG. 5 and FIG. 6 have already been described in the first embodiment, and therefore the description thereof is herein omitted.

There has been described in the first embodiment the example in which the current correction direction θI is calculated through use of the d-axis current Id and the q-axis current Iq output from the current coordinate transformation unit 109. The d-axis current Id and the q-axis current Iq are obtained by the coordinate transformation of the three-phase AC currents Iu, Iv, and Iw measured respectively by the current detection units 111, 112, and 113.

Meanwhile, in the second embodiment, in contrast to the first embodiment described above, the current correction direction θI is calculated through use of the d-axis current command Id0* and the q-axis current command Iq0* output from the electronic control unit (ECU) 150.

Therefore, in the second embodiment, as illustrated in FIG. 2, a current correction direction calculation unit 108A is disposed in place of the current correction direction calculation unit 108 illustrated in FIG. 1. The remaining configuration and operation are the same as those in the first embodiment, and therefore the description thereof is herein omitted.

In the second embodiment, the d-axis current command Id0* and the q-axis current command Iq0* are input to the current correction direction calculation unit 108A from the electronic control unit (ECU) 150. Further, the current correction direction calculation unit 108A acquires the d-axis inductance Ld and the q-axis inductance Lq from the memory. The current correction direction calculation unit 108A calculates the current correction direction θI based on the d-axis current command Id0* and the q-axis current command Iq0*, and the d-axis inductance Ld and the q-axis inductance Lq in accordance with Expression (11).

$$\theta I = \tan^{-1}\left(\frac{Ld}{Lq} \times \frac{Lq \times Iq0*}{Ld \times Id0* + \Phi m}\right) \quad (11)$$

As described above, in the second embodiment, the current correction direction θI is calculated through use of the d-axis current command Id0* and the q-axis current command Iq0* output from the electronic control unit (ECU) 150. Therefore, the following effects are expected.

In comparison to the case in which the current correction direction θ1 is calculated through use of the d-axis current Id and the q-axis current Iq obtained by the coordinate transformation of the three-phase AC currents measured respectively by the current detection units 111, 112, and 113, there is no feedback time delay generated by the current detection units. Therefore, even when the current command from the electronic control unit (ECU) 150 suddenly changes, the induced voltage can be quickly converged to lie within the maximum voltage circle in accordance with the power supply voltage.

Third Embodiment

Figure 3:
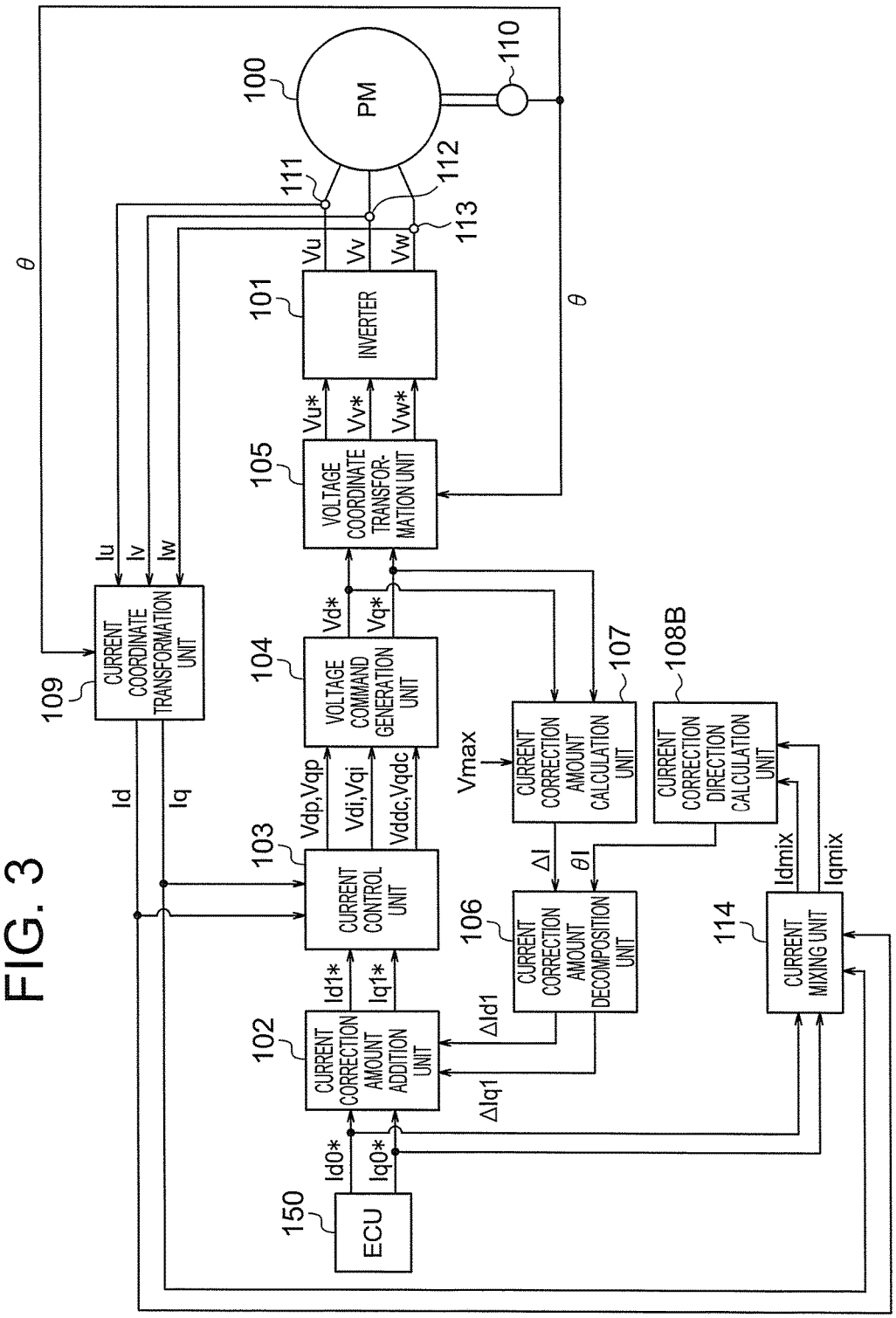
FIG. 3 is a block diagram for illustrating a configuration of a control device for a permanent magnet-type rotating electrical machine according to a third embodiment of the present invention.

Now, a control device for a permanent magnet-type rotating electrical machine (hereinafter referred to simply as "control device") according to a third embodiment of the present invention is described. FIG. 3 is a block diagram for illustrating a configuration of the control device according to the third embodiment. FIG. 5 is a current vector diagram of the control device according to the third embodiment. FIG. 6 is a voltage vector diagram of the control device according to the third embodiment. FIG. 5 and FIG. 6 have already been described in the first embodiment, and therefore the description thereof is herein omitted.

In the third embodiment, in contrast to the first and second embodiments described above, the current correction direction θI is calculated through use of the d-axis current Id and the q-axis current Iq output from the current coordinate transformation unit 109, and the d-axis current command Id0* and the q-axis current command Iq0* output from the electronic control unit (ECU) 150.

Therefore, in the third embodiment, as illustrated in FIG. 3, a current correction direction calculation unit 108B is disposed in place of the current correction direction calculation unit 108 illustrated in FIG. 1.

Further, as illustrated in FIG. 3, a current mixing unit 114 is disposed. The current mixing unit 114 adds the d-axis current Id and the q-axis current Iq, which are output from the current coordinate transformation unit 109, to the d-axis current command Id0* and the q-axis current command Iq0*, which are output from the electronic control unit (ECU) 150, to output a d-axis mixed current Idmix and a q-axis mixed current Iqmix, respectively.

The remaining configuration and operation are the same as those in the first embodiment, and therefore the description thereof is herein omitted.

$$Idmix = Id + Id0*$$

$$Iqmix = Iq + Iq0* \quad (12)$$

In the third embodiment, the d-axis mixed current Idmix and the q-axis mixed current Iqmix are input to the current correction direction calculation unit 108B from the current mixing unit 114. Further, the current correction direction calculation unit 108B acquires the d-axis inductance Ld and the q-axis inductance Lq from the memory. The current correction direction calculation unit 108B calculates the current correction direction θI based on the d-axis mixed current Idmix and the q-axis mixed current Iqmix, and the d-axis inductance Ld and the q-axis inductance Lq in accordance with Expression (13).

$$\theta I = \tan^{-1}\left(\frac{Ld}{Lq} \times \frac{Lq \times Iqmix}{Ld \times Idmix + \Phi m}\right) \quad (13)$$

As described above, in the third embodiment, the following effects are expected by calculating the current correction direction θI through use of the d-axis mixed current Idmix and the q-axis mixed current Iqmix. As described above, the d-axis mixed current Idmix and the q-axis mixed current Iqmix respectively contain not only the d-axis current Id and the q-axis current Iq obtained by the coordinate transformation of the three-phase AC currents measured by the current detection units 111, 112, and 113 but also the d-axis current command Id0* and the q-axis current command Iq0* output from the electronic control unit (ECU) 150.

In the third embodiment, the current correction direction θI is calculated based on the d-axis mixed current Idmix containing the d-axis current Id and the q-axis mixed current Iqmix containing the q-axis current Iq so that the d-axis current command Id0* and the q-axis current command Iq0* are corrected through use of the current correction direction θI. Therefore, as in the first embodiment, the d-axis current command Id0* and the q-axis current command Iq0* can be corrected even for a slight current change.

Further, in the third embodiment, the current command Id0* and the current command Iq0* output from the electronic control unit (ECU) 150 are contained in the d-axis mixed current Idmix and the q-axis mixed current Iqmix, respectively. Therefore, in comparison to the case in which the current correction direction θI is calculated only with the d-axis current Id and the q-axis current Iq, even when the current command from the electronic control unit (ECU) 150 suddenly changes, the induced voltage can be quickly converged to lie within the maximum voltage circle in accordance with the power supply voltage in consideration of the sudden change.

Fourth Embodiment

Figure 4:
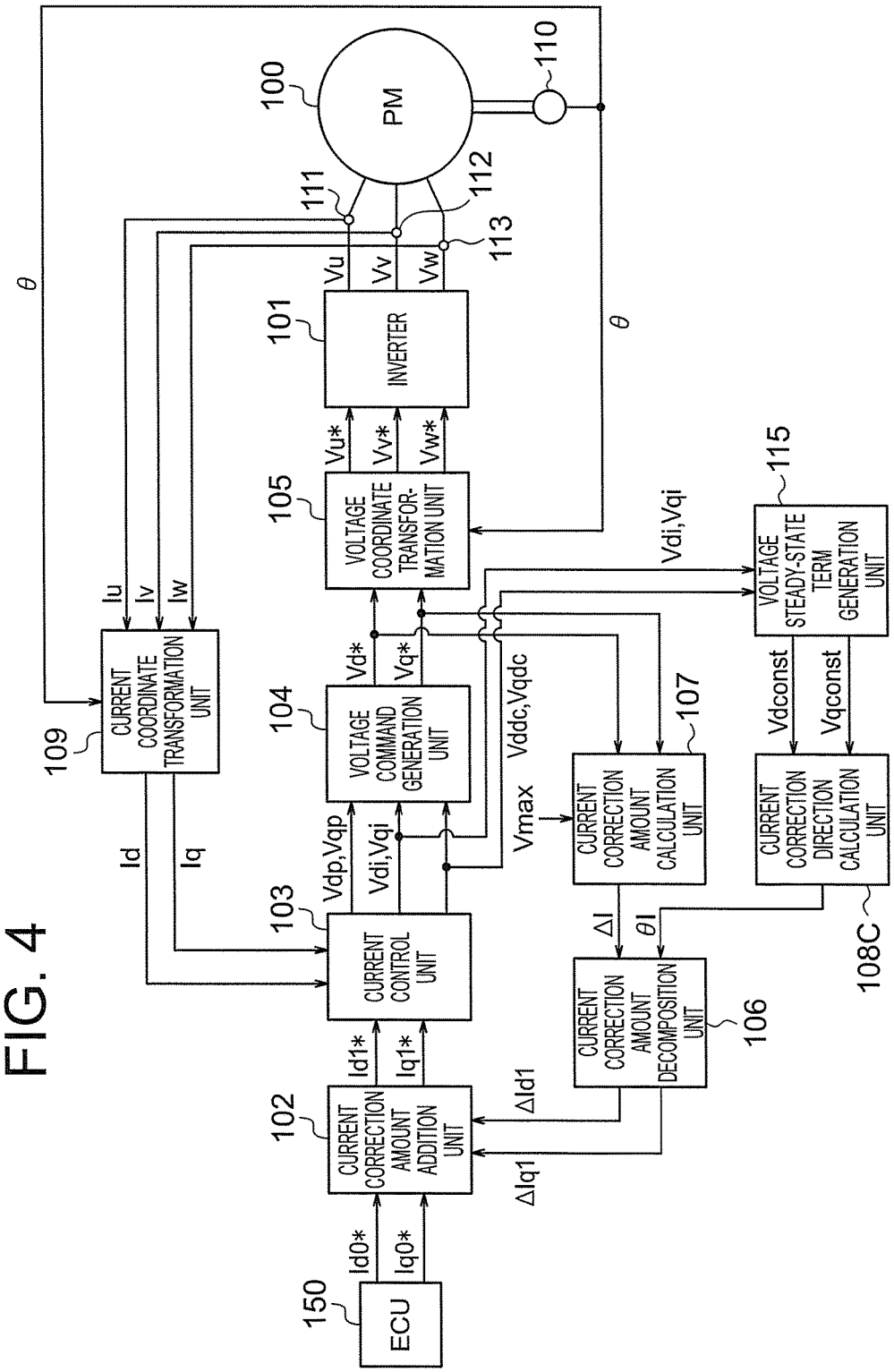
FIG. 4 is a block diagram for illustrating a configuration of a control device for a permanent magnet-type rotating electrical machine according to a fourth embodiment of the present invention.

Now, a control device for a permanent magnet-type rotating electrical machine (hereinafter referred to simply as "control device") according to a fourth embodiment of the present invention is described. FIG. 4 is a block diagram for illustrating a configuration of the control device according to the fourth embodiment. FIG. 5 is a current vector diagram of the control device according to the fourth embodiment. FIG. 6 is a voltage vector diagram of the control device according to the fourth embodiment. FIG. 5 and FIG. 6 have already been described in the first embodiment, and therefore the description thereof is herein omitted.

In the fourth embodiment, in contrast to the first embodiment described above, a voltage steady-state term generation unit 115 is disposed as illustrated in FIG. 4. The d-axis voltage non-interference term Vddc and the q-axis non-interference term Vqdc, and the d-axis voltage integral term Vdi and the q-axis voltage integral term Vqi, which are output from the current control unit 103, are input to the voltage steady-state term generation unit 115. The voltage steady-state term generation unit 115 adds the d-axis voltage non-interference term Vddc and the d-axis voltage integral term Vdi to output a d-axis voltage steady-state term Vdconst and adds the q-axis voltage non-interference term Vqdc and the q-axis voltage integral term Vqi to output a q-axis voltage steady-state term Vqconst in accordance with Expression (14).

$$Vdconst = Vdi + Vddc$$

$$Vqconst = Vqi + Vqdc \qquad (14)$$

Further, in the fourth embodiment, as illustrated in FIG. 4, a current correction direction calculation unit 108C is disposed in place of the current correction direction calculation unit 108 illustrated in FIG. 1.

The remaining configuration and operation are the same as those in the first embodiment, and therefore the description thereof is herein omitted.

In the fourth embodiment, the d-axis voltage steady-state term Vdconst and the q-axis voltage steady-state term Vqconst are input to the current correction direction calculation unit 108C from the voltage steady-state term generation unit 115. Further, the current correction direction calculation unit 108C acquires the d-axis inductance Ld and the q-axis inductance Lq from the memory. The current correction direction calculation unit 108C calculates the current correction direction θI based on the d-axis voltage steady-state term Vdconst and the q-axis voltage steady-state term Vqconst, and the d-axis inductance Ld and the q-axis inductance Lq in accordance with Expression (15).

$$\theta I = \tan^{-1}\left(\frac{Ld}{Lq} \times \frac{Vdconst}{Vqconst}\right) \qquad (15)$$

As described above, in the fourth embodiment, the current correction direction θI is calculated based on the d-axis voltage steady-state term Vdconst and the q-axis voltage steady-state term Vqconst. Through use of the current correction direction θI, the d-axis current command Id0* and the q-axis current command Iq0* are corrected. Thus, the following effects are expected.

In the fourth embodiment, the current correction direction θI is calculated based on the d-axis voltage steady-state term Vdconst and the q-axis voltage steady-state term Vqconst. Thus, even when a temperature of each of the stator, the rotor, an armature, and other components of the permanent magnet-type rotating electrical machine 100 changes, the induced voltage can be converged by the field-weakening control to lie within the maximum voltage circle in accordance with the power supply voltage.

The invention claimed is:

1. A control device for a permanent magnet-type rotating electrical machine,
   wherein the permanent magnet-type rotating electrical machine includes:
     a rotor including a permanent magnet; and
     a stator including coils configured to generate a rotating magnetic field for rotating the rotor,
   wherein the control device comprises an inverter, a magnetic-pole position detector, current detectors, a processor and a memory,
     wherein the inverter receives AC voltage commands as input and applies AC voltages to the permanent magnet-type rotating electrical machine based on the AC voltage commands;
     wherein the magnetic-pole position detector detects a magnetic-pole position of the rotor;
     wherein the current detectors respectively detect AC currents flowing between the inverter and the permanent magnet-type rotating electrical machine;
     wherein the processor:
       transforms the AC currents respectively detected by the current detectors into a d-axis current and a q-axis current with a magnetic field direction at the magnetic-pole position being defined as a d-axis and a direction orthogonal to the d-axis being defined as a q-axis;
       receives a d-axis current command and a q-axis current command as input from outside, and performs a correction by correcting the d-axis current command and the q-axis current command to output a corrected d-axis current command and a corrected q-axis current command;
       calculates a d-axis voltage non-interference term and a q-axis voltage non-interference term, a d-axis voltage proportional term and a q-axis voltage proportional term, and a d-axis voltage integral term and a q-axis voltage integral term based on the d-axis current and the q-axis current, and on the corrected d-axis current command and the corrected q-axis current command so that the d-axis current follows the corrected d-axis current command and the q-axis current follows the corrected q-axis current command;
       generates a d-axis voltage command and a q-axis voltage command based on the d-axis voltage non-interference term and the q-axis voltage non-interference term, the d-axis voltage proportional term and the q-axis voltage proportional term, and the d-axis voltage integral term and the q-axis voltage integral term;
       transforms the d-axis voltage command and the q-axis voltage command into the AC voltage commands to be input to the inverter;
       calculates a voltage deviation being a deviation between the d-axis voltage command and the q-axis voltage command and a maximum voltage in accordance with a power supply voltage;

calculates a current correction amount in accordance with the voltage deviation;

wherein the memory prestores a d-axis inductance and a q-axis inductance as fixed values or map values that use the d-axis current and the q-axis current as arguments;

wherein the processor further:

calculates a current correction direction based on at least any one of a set of the d-axis current and the q-axis current and a set of the d-axis current command and the q-axis current command, and on the d-axis inductance and the q-axis inductance; and calculates a d-axis current correction amount and a q-axis current correction amount to be used for the correction based on the current correction amount and the current correction direction, wherein, when the processor performs the correction, the processor adds the d-axis current correction amount to the d-axis current command to calculate the corrected d-axis current command, and adds the q-axis current correction amount to the q-axis current command to calculate the corrected q-axis current command.

2. The control device for a permanent magnet-type rotating electrical machine according to claim 1, wherein the processor calculates the current correction direction based on the d-axis current and the q-axis current, and on the d-axis inductance and the q-axis inductance.

3. The control device for a permanent magnet-type rotating electrical machine according to claim 1, wherein the processor calculates the current correction direction based on the d-axis current command and the q-axis current command, and on the d-axis inductance and the q-axis inductance.

4. The control device for a permanent magnet-type rotating electrical machine according to claim 1, wherein the processor calculates the current correction direction based on a d-axis mixed current obtained by adding the d-axis current command to the d-axis current and a q-axis mixed current obtained by adding the q-axis current command to the q-axis current, and on the d-axis inductance and the q-axis inductance.

5. A control device for a permanent magnet-type rotating electrical machine, wherein the permanent magnet-type rotating electrical machine includes:
a rotor including a permanent magnet; and
a stator including coils configured to generate a rotating magnetic field for rotating the rotor, the control device comprises an inverter, a magnetic-pole position detector, current detectors, a processor and a memory, wherein the inverter receives AC voltage commands as input and applies AC voltages to the permanent magnet-type rotating electrical machine based on the AC voltage commands;

wherein the magnetic-pole position detector detects a magnetic-pole position of the rotor;

wherein the current detectors respectively detect AC currents flowing between the inverter and the permanent magnet-type rotating electrical machine;

wherein the processor:

transforms the AC currents respectively detected by the current detectors into a d-axis current and a q-axis current with a magnetic field direction at the magnetic-pole position being defined as a d-axis and a direction orthogonal to the d-axis being defined as a q-axis;

receives a d-axis current command and a q-axis current command as input from outside, and performs a correction by correcting the d-axis current command and the q-axis current command to output a corrected d-axis current command and a corrected q-axis current command;

calculates a d-axis voltage non-interference term and a q-axis voltage non-interference term, a d-axis voltage proportional term and a q-axis voltage proportional term, and a d-axis voltage integral term and a q-axis voltage integral term based on the d-axis current and the q-axis current, and on the corrected d-axis current command and the corrected q-axis current command so that the d-axis current follows the corrected d-axis current command and the q-axis current follows the corrected q-axis current command;

generates a d-axis voltage command and a q-axis voltage command based on the d-axis voltage non-interference term and the q-axis voltage non-interference term, the d-axis voltage proportional term and the q-axis voltage proportional term, and the d-axis voltage integral term and the q-axis voltage integral term;

transforms the d-axis voltage command and the q-axis voltage command into the AC voltage commands to be input to the inverter;

calculates a voltage deviation being a deviation between the d-axis voltage command and the q-axis voltage command and a maximum voltage in accordance with a power supply voltage;

calculates a current correction amount in accordance with the voltage deviation;

generates a d-axis voltage steady-state term and a q-axis voltage steady-state term based on the d-axis voltage non-interference term and the q-axis voltage non-interference term, and the d-axis voltage integral term and the q-axis voltage integral term;

wherein the memory prestores a d-axis inductance and a q-axis inductance as fixed values or map values that use the d-axis current and the q-axis current as arguments;

wherein the processor further:

calculates a current correction direction based on the d-axis voltage steady-state term and the q-axis voltage steady-state term and on the d-axis inductance and the q-axis inductance; and calculates a d-axis current correction amount and a q-axis current correction amount to be used for the correction based on the current correction amount and the current correction direction, wherein, when the processor performs the correction, the processor adds the d-axis current correction amount to the d-axis current command to calculate the corrected d-axis current command, and adds the q-axis current correction amount to the q-axis current command to calculate the corrected q-axis current command.

* * * * *